(12) United States Patent
Ryu et al.

(10) Patent No.: US 12,127,167 B2
(45) Date of Patent: Oct. 22, 2024

(54) BI-DIRECTIONAL SIDELINK RESOURCE SELECTION WITH BI-DIRECTIONAL RESOURCE ALLOCATION INDICATION

(71) Applicant: QUALCOMM Incorporated, San Diego, CA (US)

(72) Inventors: Jung Ho Ryu, Fort Lee, NJ (US); Lik Hang Silas Fong, Bridgewater, NJ (US); Chih-Hao Liu, San Diego, CA (US); Jing Sun, San Diego, CA (US); Junyi Li, Fairless Hills, PA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/459,833

(22) Filed: Aug. 27, 2021

(65) Prior Publication Data

US 2023/0064256 A1   Mar. 2, 2023

(51) Int. Cl.
| | |
|---|---|
| *H04W 72/04* | (2023.01) |
| *H04W 4/46* | (2018.01) |
| *H04W 72/02* | (2009.01) |
| *H04W 72/0453* | (2023.01) |
| *H04W 72/12* | (2023.01) |
| *H04W 72/20* | (2023.01) |
| *H04W 72/56* | (2023.01) |

(52) U.S. Cl.
CPC ....... *H04W 72/02* (2013.01); *H04W 72/0453* (2013.01); *H04W 72/20* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 11,445,529 B2 * | 9/2022 | Uziel | H04L 1/1819 |
| 2005/0202745 A1 * | 9/2005 | Nishimura | H01J 1/316 |
| | | | 445/6 |
| 2018/0234980 A1 * | 8/2018 | Li | H04W 74/0816 |
| 2018/0295646 A1 * | 10/2018 | Faurie | H04W 72/04 |
| 2020/0022089 A1 * | 1/2020 | Guo | H04W 52/242 |
| 2020/0029318 A1 * | 1/2020 | Guo | H04L 1/1822 |
| 2020/0029340 A1 * | 1/2020 | He | H04W 76/14 |

(Continued)

*Primary Examiner* — Sai Aung
(74) *Attorney, Agent, or Firm* — Holland & Hart LLP

(57) ABSTRACT

Methods, systems, and devices for wireless communications are described. A first user equipment (UE) may receive a sidelink control indicator (SCI) from a second UE and selects resources and directions for communication. The SCI may include one or more resources and corresponding directions reserved by the second UE. The first UE may use the resources and directions indicated in the received SCI to select available resources with which to reserve forward direction transmissions, reverse direction transmissions, or both. For example, the first UE may avoid reserving resources and directions corresponding to the resources and directions indicated in the received SCI, or may reserve such resources despite receiving the SCI, such as if the received SCI has a relatively low reference signal received power (RSRP). The first UE may transmit an SCI indicating resources reserved by the first UE and associated directionalities.

26 Claims, 11 Drawing Sheets

(56) References Cited

U.S. PATENT DOCUMENTS

| | | | |
|---|---|---|---|
| 2020/0037343 A1* | 1/2020 | He | H04W 28/0268 |
| 2021/0160821 A1* | 5/2021 | Lin | H04W 72/02 |
| 2022/0095327 A1* | 3/2022 | Wang | H04W 72/1263 |
| 2022/0346081 A1* | 10/2022 | Luo | H04W 52/0235 |

* cited by examiner

BI-DIRECTIONAL SIDELINK RESOURCE SELECTION WITH BI-DIRECTIONAL RESOURCE ALLOCATION INDICATION

FIELD OF TECHNOLOGY

The present disclosure relates to wireless communications, including bi-directional sidelink resource selection with bi-directional resource allocation indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may be configured to reserve resources for sidelink transmissions to other UEs. But in some situations, existing resource reservation techniques may be deficient.

SUMMARY

The described techniques relate to improved methods, devices, and apparatuses that support techniques for bi-directional sidelink resource selection with bi-directional resource allocation indication. The described techniques may enable a first user equipment (UE) to receive a sidelink control indicator (SCI) from a second UE and selects resources and directions for communication. The SCI may include one or more resources and corresponding directions reserved by the second UE. The first UE may use the resources and directions indicated in the received SCI to select available resources with which to reserve forward direction transmissions, reverse direction transmissions, or both. For example, the first UE may avoid reserving resources and directions corresponding to the resources and directions indicated in the received SCI, or may reserve such resources despite receiving the SCI, such as if the received SCI has a relatively low reference signal received power (RSRP). The first UE may transmit its own SCI indicating resources reserved by the first UE and associated directionalities, and may communicate with other UEs using the resources in the corresponding directions.

A method for wireless communications at a first user equipment (UE) is described. The method may include obtaining, at a first protocol layer of the first UE from a second protocol layer of the first UE, an indication of a first set of parameters for a forward direction of a sidelink with a second UE and a second set of parameters for a reverse direction of the sidelink, selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, and transmitting a sidelink control message to the second UE, the sidelink control message indicating the selected set of resources for the sidelink communication and the direction of the sidelink communication.

An apparatus for wireless communications at a first UE is described. The apparatus may include a processor, memory coupled with the processor, and instructions stored in the memory. The instructions may be executable by the processor to cause the apparatus to obtain, at a first protocol layer of the first UE from a second protocol layer of the first UE, an indication of a first set of parameters for a forward direction of a sidelink with a second UE and a second set of parameters for a reverse direction of the sidelink, select, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, and transmit a sidelink control message to the second UE, the sidelink control message indicating the selected set of resources for the sidelink communication and the direction of the sidelink communication.

Another apparatus for wireless communications at a first UE is described. The apparatus may include means for obtaining, at a first protocol layer of the first UE from a second protocol layer of the first UE, an indication of a first set of parameters for a forward direction of a sidelink with a second UE and a second set of parameters for a reverse direction of the sidelink, means for selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, and means for transmitting a sidelink control message to the second UE, the sidelink control message indicating the selected set of resources for the sidelink communication and the direction of the sidelink communication.

A non-transitory computer-readable medium storing code for wireless communications at a first UE is described. The code may include instructions executable by a processor to obtain, at a first protocol layer of the first UE from a second protocol layer of the first UE, an indication of a first set of parameters for a forward direction of a sidelink with a second UE and a second set of parameters for a reverse direction of the sidelink, select, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, and transmit a sidelink control message to the second UE, the sidelink control message indicating the selected set of resources for the sidelink communication and the direction of the sidelink communication.

Some examples of the method, apparatuses, and non-transitory computer-readable medium described herein may further include operations, features, means, or instructions for receiving a sidelink control indicator from a third UE, the sidelink control indicator indicating a second set of resources for a second sidelink communication having a second direction that may be one of the forward direction or the reverse direction, where the set of resources for the sidelink communication may be selected based on the second direction of the second sidelink communication.

Some examples of the method, apparatuses, and non-transitory computer-readable medium described herein may further include operations, features, means, or instructions for comparing a reference signal received power of the sidelink control indicator with a threshold value, where the set of resources for the sidelink communication may be selected based on the comparing.

Some examples of the method, apparatuses, and non-transitory computer-readable medium described herein may further include operations, features, means, or instructions for comparing a first priority of the sidelink communication with a second priority of the second sidelink communication, the second priority indicated in the received sidelink control indicator, where the set of resources for the sidelink communication may be selected based on the comparing.

In some examples of the method, apparatuses, and non-transitory computer-readable medium described herein, the sidelink control indicator includes a direction indicator identifying the second direction of the second sidelink communication.

In some examples of the method, apparatuses, and non-transitory computer-readable medium described herein, at least one parameter of the first set of parameters and the second set of parameters may have a same value.

In some examples of the method, apparatuses, and non-transitory computer-readable medium described herein, the at least one parameter includes a resource pool, a quantity of sub-channels to be used for the sidelink communication, or both.

In some examples of the method, apparatuses, and non-transitory computer-readable medium described herein, at least one parameter of the first set of parameters and the second set of parameters may have different values.

In some examples of the method, apparatuses, and non-transitory computer-readable medium described herein, the at least one parameter includes a resource pool, a quantity of sub-channels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination thereof.

Some examples of the method, apparatuses, and non-transitory computer-readable medium described herein may further include operations, features, means, or instructions for receiving control signaling indicating a resource allocation mode for sidelink communications, where the first set of parameters and the second set of parameters may be obtained based on the control signaling.

In some examples of the method, apparatuses, and non-transitory computer-readable medium described herein, the control signaling may be received in a radio resource control message.

Some examples of the method, apparatuses, and non-transitory computer-readable medium described herein may further include operations, features, means, or instructions for receiving the sidelink communication from the second UE in the selected set of resources based on the transmitted sidelink control message, where the direction of the sidelink communication may be the reverse direction.

Some examples of the method, apparatuses, and non-transitory computer-readable medium described herein may further include operations, features, means, or instructions for transmitting the sidelink communication to the second UE in the selected set of resources based on the transmitted sidelink control message, where the direction of the sidelink communication may be the forward direction.

In some examples of the method, apparatuses, and non-transitory computer-readable medium described herein, the first protocol layer includes a physical layer and the second protocol layer includes a medium access control layer.

In some examples of the method, apparatuses, and non-transitory computer-readable medium described herein, the first UE includes a first programmable logic controller, a first sensor/actuator, or any combination thereof, and the second UE includes a second programmable logic controller, a second sensor/actuator, or any combination thereof.

DETAILED DESCRIPTION

Figure 1:
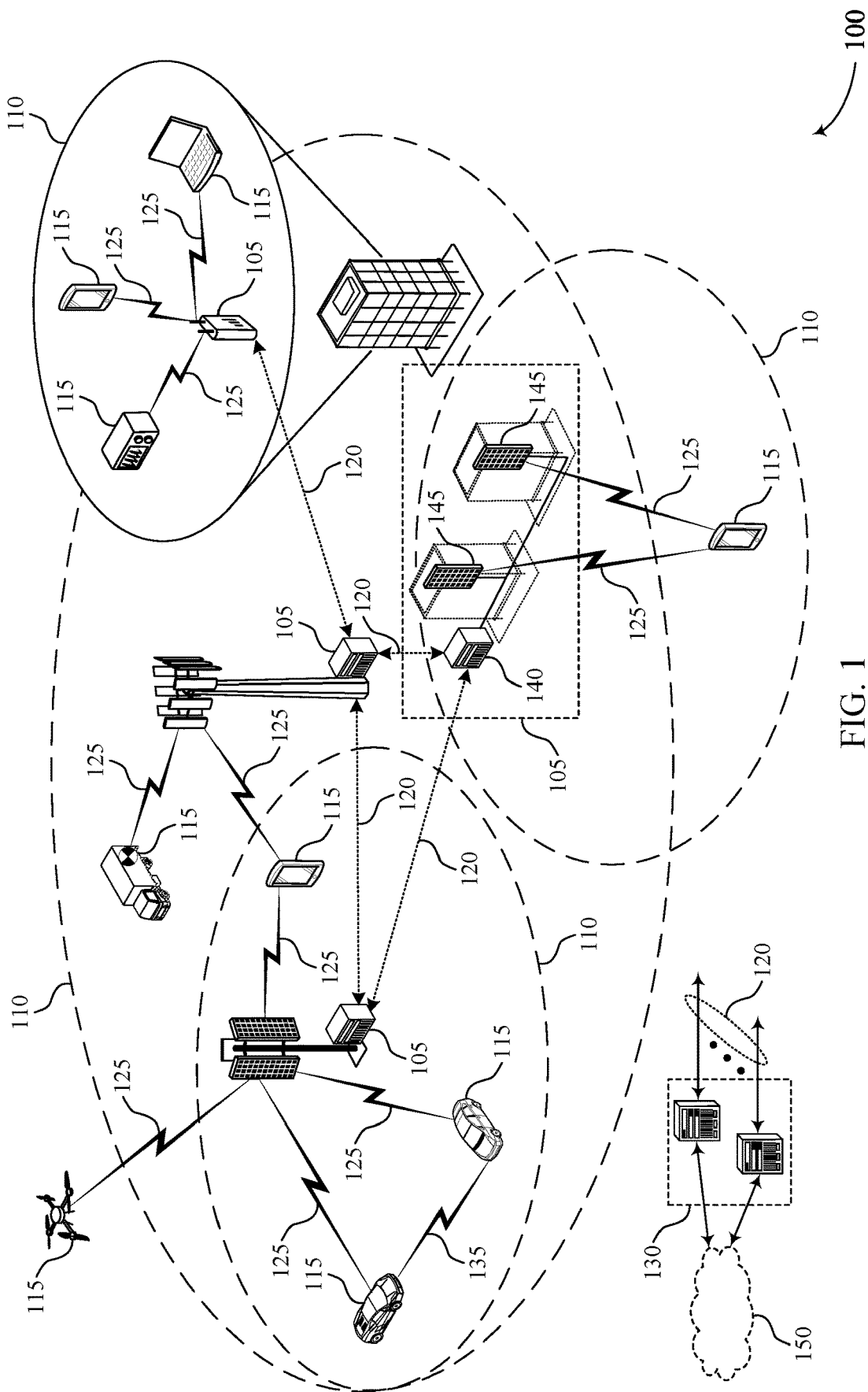
FIGS. 1 and 2 illustrate examples of wireless communications systems that support bi-directional sidelink resource selection with bi-directional resource allocation indication in accordance with aspects of the present disclosure.

In some wireless communications systems, multiple user equipments (UEs) may communicate (e.g., transmit communications, receive communications, or both) with each other using sidelink connections. To transmit to a second UE, a first UE may reserve one or more resources for the transmission. For example, the first UE may receive a sidelink control indicator (SCI) from a third UE (or, in some cases, the second UE). The SCI may indicate one or more resources that the third UE has reserved for transmissions. The first UE may refrain from reserving the same one or more resources for transmission that have already been indicated in the SCI as reserved by the third UE. The first UE may instead reserve other resources for transmission. The first UE may transmit an SCI indicating the resources that the first UE reserved, and transmit communications using the reserved resources. In such cases, the first UE may not be able to reserve resources for reverse transmissions (e.g., transmissions received at the first UE), as a lack of information included in the received SCI may result in interference if the first UE attempts to reserve resources for reverse transmissions.

According to the techniques described herein, the received SCI may include one or more corresponding direction indicators (e.g., forward, reverse, or both, with respect to the third UE) for the one or more resources indicated in the received SCI as being reserved by the third UE. Based on the reserved resources indicated in the received SCI and corresponding directionalities of those resources, the first UE may selectively reserve resources for reverse transmissions (e.g., transmissions received at the first UE), resources for forward transmissions (Tx), or both. For example, if the first UE receives an SCI from the third UE that indicates that the third UE has reserved a first one or more resources in the reverse direction with respect to the third UE, then the first UE may avoid reserving the first one or more resources for forward transmissions with respect to the first UE, thus avoiding interference at the third UE. Similarly, if the first UE receives an SCI from the third UE that indicates that the third UE has reserved a second one or more resources in the forward direction with respect to the third UE, then the first UE may avoid reserving the second one or more resources for reverse transmissions with respect to the first UE, thus avoiding interference at the first UE. In some cases, if a UE receives an SCI with a relatively low reference signal received power (RSRP), then interference may be relatively low or otherwise insignificant, and the UE may reserve the corresponding resources and directionalities despite the indication in the SCI.

Aspects of the disclosure are initially described in the context of wireless communications systems. Aspects of the disclosure are further illustrated by and described with reference to a transmission scheme, a process flow, apparatus diagrams, system diagrams, and flowcharts that relate to bi-directional sidelink resource selection with bi-directional resource allocation indication.

FIG. 1 illustrates an example of a wireless communications system 100 that supports bi-directional sidelink resource selection with bi-directional resource allocation indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical (PHY) layer structure for supporting the communication links 125. For example, a carrier used for a communication link 125 may include a portion of a radio frequency spectrum band (e.g., a bandwidth part (BWP)) that is operated according to one or more PHY layer channels for a given radio access technology (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a first UE 115 may receive an SCI from a second UE 115 and may select resources and directions for communication. The SCI may include one or more resources and corresponding directions reserved by the second UE 115. The first UE 115 may use the resources and directions indicated in the received SCI to select available resources with which to reserve forward direction transmissions, reverse direction transmissions, or both. For example, the first UE 115 may avoid reserving resources and directions corresponding to the resources and directions indicated in the received SCI, or may reserve such resources despite receiving the SCI, such as if the received SCI has a relatively low RSRP. The first UE 115 may transmit its own SCI indicating resources reserved by the first UE 115 and associated directionalities, and may communicate with other UEs 115 (e.g., using D2D communication links 135) using the resources in the corresponding directions.

Figure 2:
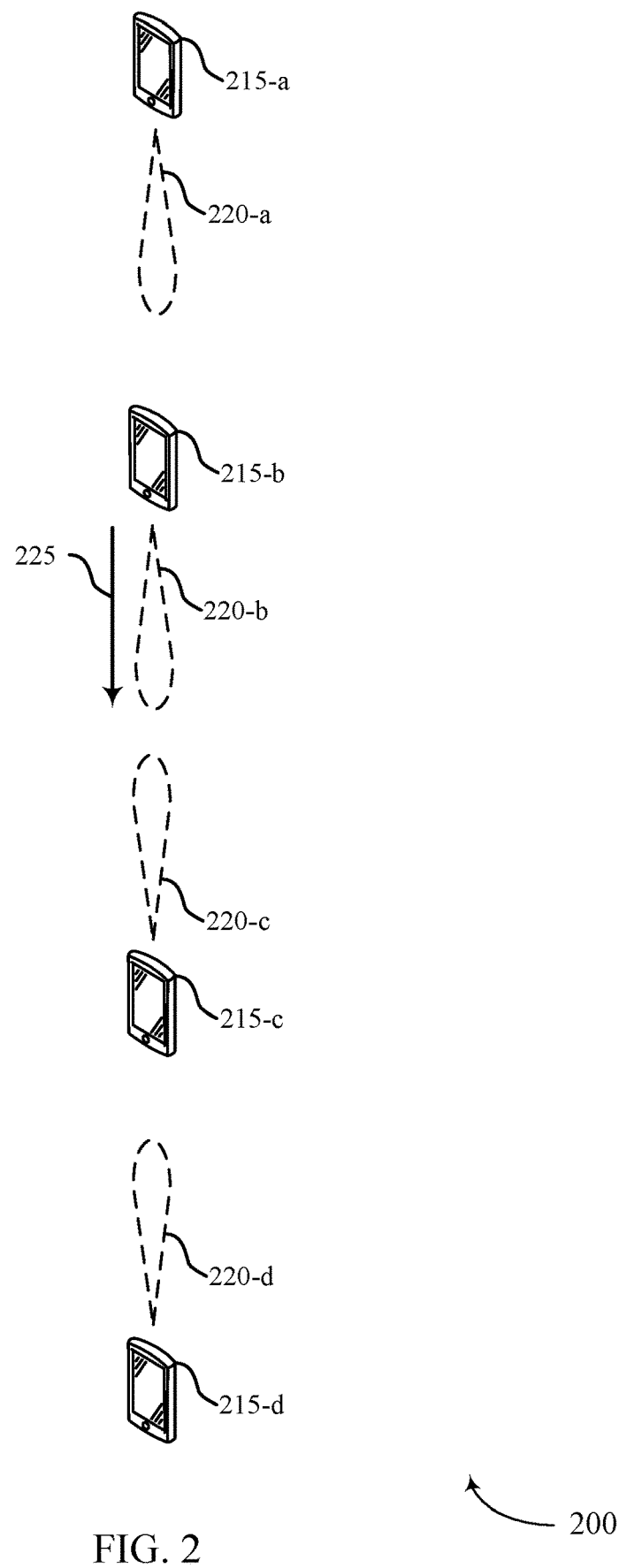

FIG. 2 illustrates an example of a wireless communications system 200 that supports techniques for bi-directional sidelink resource selection with bi-directional resource allocation indication in accordance with aspects of the present disclosure. The wireless communications system 200 may implement or be implemented by aspects of the wireless communications system 100 as described with reference to FIG. 1. For example, the wireless communications system 200 may include UEs 215, which may be examples of UEs 115 as described herein. The wireless communications system 200 may support improvements to interference, processing, power consumption, and more efficient utilization of communication resources, among other benefits.

The wireless communications system 200 may support sidelink communications between various UEs 215. For example, a UE 215 may transmit a corresponding transmission 220 (e.g., a beam) over a sidelink connection to any other UE 215 using one or more resources (e.g., frequency and time resources). For example, UE 215-a may transmit transmission 220-a to any of UE 215-b, UE 215-c, or UE 215-d. The wireless communications system 200 may not be limited to the four example UEs 215 as illustrated in the wireless communications system 200, and may support one, two, three, four, or more UEs 215 in communication.

To transmit over a sidelink connection in a unidirectional manner (e.g., forward transmissions), UE 215-d (e.g., in a mode 2) may determine which resources are available for transmission, and may reserve such resources for the unidirectional transmission (e.g., scheduling resources for transmission without scheduling resources for receiving). Mode 2 may refer to configurations where UEs 215, rather than base stations, reserve such resources. A base station may configure UE 215-d with resource allocation mode 2, mode 1, or the like, via control signaling (e.g., RRC signaling). To determine which resources are available for transmission, UE 215-d may determine which resources are being used or will be used by other UEs 215 for transmissions so that UE 215-d can avoid reserving such resources. For example, UE 215-d may sense for SCIs during a sensing window (e.g., transmitted physical sidelink control channel (PSCCH), which may include such SCIs), and may receive SCI 225 (e.g., SCI1, SCI2, or the like) from UE 215-b during the sensing window. SCI 225 may include one or more resources that UE 215-b may use for a transmission (e.g., unidirectional transmission traffic from UE 215-b), and in some cases may include a priority of the UE 215-b transmission and a resource reservation interval or resource reservation period field. UE 215-d may then reserve resources during a resource selection window, which may be after the sensing window. UE 215-d may reserve resources other than the one or more resources indicated in the received SCI 225 to avoid potential interference associated with transmitting using the same resources. UE 215-d may then transmit using the reserved resources. In some cases, a receiving UE 215 may transmit feedback (e.g., HARQ feedback) to UE 215-d (e.g., over a physical sidelink feedback channel (PSFCH)), indicating that the transmission was successfully received. The sensing window, resource selection window, priority information, and resource reservation period may be illustrated or otherwise described with reference to FIG. 3.

In some cases, it may be desirable for wireless communications system 200 to support a UE 215 scheduling bidirectional traffic (e.g., forward and reverse sidelink traffic with respect to the UE 215) in additional or alternatively to scheduling unidirectional traffic (e.g., forward sidelink traffic). In some aspects, a UE 215 may operate in a "forward" mode or communicate "forward" transmissions, which may refer to transmitting sidelink communications to one or more other UEs 215. In some other aspects, the UE 215 may operate in a "reverse" mode or communicate "reverse" transmissions, which may refer to receiving sidelink communications from one or more other UEs 215.

To support UEs 215 transmitting and receiving over a sidelink in a bidirectional manner (e.g., for URLLC), wireless communications system 200 may include techniques that assist or anticipate scheduling bidirectional traffic (e.g., data) for sidelink communications (e.g., sidelink communications over physical sidelink shared channel (PSSCH), PSCCH, or both, where PSFCH may not be reliable in comparison to PSCCH). For example, UE 215-b (e.g., which in some cases may be a programmable logic controller (PLC) UE 215) may denote or instruct resource allocation for bidirectional sidelink traffic (e.g., for communication with a sensor/actuator (S/A) UE 215) via an indicator in SCI 225. Any of UEs 215 may be a PLC UE 215 or an S/A UE 215. A retransmission indicator in SCI 225, which may be SCI1, may be used for indicating a retransmission request. In some cases, a PLC UE 215 may be able to request retransmission on a reverse sidelink using the transmission indicator in SCI1, and PSSCH bundling may be enabled for retransmissions on the reverse sidelink, which may result in improved reliability of communications. SCI 225 may include reserved resources and one or more direction indicators to specify directions of the reserved resources (e.g., a forward direction, a reverse direction, or the like). In some cases (e.g., in mode 2), even if UE 215-d may be able to decode SCI2, the UE 215-d may also be able to decode SCI1 to determine such resource reservation information. In some examples, if the reserved resources may be in a reverse direction, or an alternate direction, then a reverse sidelink random access (RA) radio network temporary identifier (RNTI) or an alternate sidelink RA RNTI may be used to scramble a cyclic redundancy check (CRC) of SCI 225 (e.g., SCI2). The reverse sidelink RA RNTI or alternative sidelink RA RNTI may be preconfigured and may be common to some or all reverse-link or alternate-link reservations. In some other examples, if the UE 215-b (e.g., which may be a PLC UE) reserves one or more (e.g., N) transmissions (e.g., resources for the one or more transmissions), then N bits in SCI 225 (e.g., SCI2) may be used to indicated directionalities of such transmissions.

Other techniques that assist or anticipate scheduling bidirectional traffic (e.g., data) for sidelink communications may include one or more network devices (e.g., a base station) preconfiguring traffic directions via RRC signaling or other upper layer signaling for one or more UEs 215 (e.g., a PLC UE 215, any one or more UEs 215 that the PLC UE 215 may be transmitting to, other UEs 215 or devices, or any combination thereof). A UE 215 (e.g., the PLC UE 215) may allocate N future transmissions (e.g., resources corresponding to the transmissions) with one or more indices (e.g., corresponding to 1, 2, 3, . . . , N). The UE 215 may allocate transmissions with odd indices to the reverse direction and transmissions with even indices to the forward direction, or vice versa. In some cases, all resources may be allocated in the reverse direction. The UE 215 may transmit PSCCH to other UEs 215 indicating such allocations in the forward direction, reverse direction, or both.

According to techniques described herein, UEs 215 may use reserved resources and associated directionalities as indicated by received SCIs to select resources to reserve for forward transmissions, reverse transmissions, or both. In some examples, such UEs 215 may avoid the already-reserved resources and directionalities as indicated in the received SCIs when selecting resources. In some other examples, such UEs 215 may not avoid the already-reserved resources and directionalities when selecting resources, such as if the associated received SCI is received with a relatively low RSRP. Such UEs 215 may transmit SCIs indicating the selected resources and directionalities. For example, if UE 215-*b* selects resources for transmission in the forward direction, UE 215-*b* may indicate in SCI 225 that the UE 215-*b* may use the indicated reserved resources to transmit to UE 215-*d*, which may be an intended recipient of SCI 225. Similarly, if UE 215-*b* reserves resources for transmission in the reverse direction (e.g., reception at UE 215-*b*), UE 215-*b* may indicate in SCI 225 that UE 215-*d*, which may be the intended recipient of SCI 225, may use the indicated reserved resources to transmit to UE 215-*b*.

Figure 3:
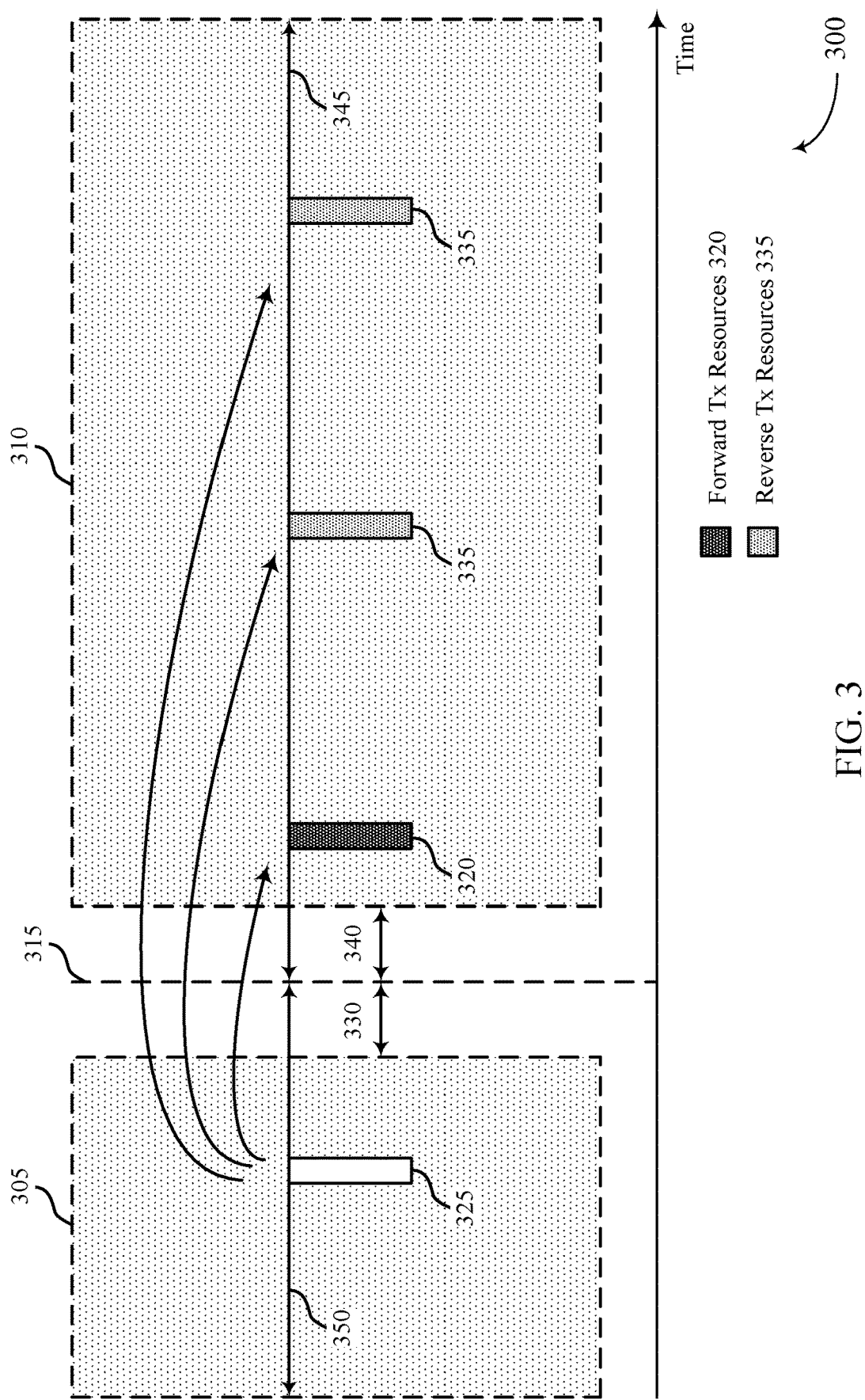
FIG. 3 illustrates an example of a transmission scheme that supports bi-directional sidelink resource selection with bi-directional resource allocation indication in accordance with aspects of the present disclosure.

FIG. 3 illustrates an example of a transmission scheme 300 that supports techniques for bi-directional sidelink resource selection with bi-directional resource allocation indication in accordance with aspects of the present disclosure. The transmission scheme 300 may implement or be implemented by aspects of the wireless communications system 100, wireless communications system 200, or both, as described with reference to FIGS. 1 and 2. For example, the transmission scheme 300 may illustrate sensing and resource selection at a UE, which may be an example of corresponding devices described with reference to FIGS. 1 and 2.

The transmission scheme 300 may support sensing during a sensing window 305 and resource selection during a resource selection window 310 at the UE. The sensing window 305 and resource selection window 310 may be separated by a resource selection trigger 315. Aspects of the transmission scheme 300, including the sensing window 305, resource selection window 310, and resource selection trigger 315, may illustrate how a UE may select resources and corresponding directions for forward transmissions, reverse transmissions (e.g., receiving), or both, so as to avoid interference caused by transmitting or receiving over corresponding resources and directions already used by other UEs for communication.

In some examples, the UE, via a PHY layer, may sense for SCIs during the sensing window 305 (e.g., may sense at some times, or at all times). For example, the UE may sense and receive SCI 325 that may include one or more resources (e.g., forward Tx resources 320, reverse Tx resources 335, whose directions may be with respect to the UE that transmitted the SCI 325). It may be noted that forward Tx resources 320, reverse Tx resources 335, or both, may include one or more time and frequency resources. The SCI 325 may indicate that another UE may be reserving the one or more resources. In some examples, the SCI 325 may include one or more directionalities associated with the one or more resources. In some examples, duration $T_0$ 350 may include the duration of sensing window 305 and duration $T_{proc,0}^{SL}$ 330. Duration $T_{proc,0}^{SL}$ 330 may refer to a processing duration at the UE between sensing and resource selection trigger 315.

When the UE, via a MAC layer, decides to perform a forward transmission, reverse transmission, or both (e.g., create a sidelink grant), the UE, via the MAC layer, may trigger resource selection (e.g., resource selection window 310) at the PHY layer of the UE using the resource selection trigger 315. The UE (e.g., in mode 2), via the MAC layer, may provide one or more parameters to the PHY layer for the decided forward transmission or reverse transmission (e.g., the PHY layer may obtain the one or more parameters from the MAC layer). Such parameters may include a resource pool from which the resources are to be reported, one or more priority parameters for sidelink communications (e.g., a Layer 1 (L1) priority parameter, which may be referred to as $prio_{TX}$ for forward Tx transmissions), a remaining packet delay budget, a number of sub-channels to be used for PSSCH/PSCCH transmission in a slot (e.g., which may be referred to as $L_{subCH}$), a resource reservation interval (e.g., which may be referred to as $P_{rsvp\_TX}$ for forward Tx transmissions, and may have units of milliseconds (ms)), a periodicity parameter, a frequency parameter, an indication of a communication pattern (e.g., an interleaving pattern) with forward and reverse transmissions (e.g., forward-reverse-forward-reverse (FRFR) or forward-forward-reverse-reverse (FFRR)), and, if a higher layer (e.g., the MAC layer) requests the UE to determine a subset of resources from which the higher layer may select resources for PSSCH or PSCCH transmission as a part of a re-evaluation or a pre-emption procedure, the higher layer (e.g., the MAC layer) may provide a set of resources (e.g., $r_0$, $r_1$, $r_2$, among others) which may be subject to re-evaluation and may provide a second set of resources (e.g., $r'_0$, $r'_1$, $r'_2$, among others) which may be subject to pre-emption, or any combination of these parameters. In some cases, the UE may determine the subset of resources as requested by higher layers before or after a slot $r''_i$-$T_3$, where $r''_i$ may be a slot with a smallest slot index among $r_0$, $r_1$, $r_2$, and others, and $r'_0$, $r'_1$, $r'_2$, and others. Duration $T_3$ may be equal to duration $T_{proc,1}^{SL}$, where duration $T_{proc,1}^{SL}$ may be specified in a standard, where $\mu_{SL}$ may be an SCS configuration of a sidelink BWP.

Such parameters may be specified in a standard for forward Tx transmissions, and any one or more of such parameters may apply for reverse Tx transmissions. That is, there may be two sets of such parameters, one set corresponding to forward Tx transmissions, and the other set corresponding to reverse Tx transmissions. Each set may include the same parameters, or may include one or more different (e.g., separate) parameters compared to the other set. In some cases, one or more parameter values corresponding to the forward Tx parameter set may be the same as or different from one or more parameter values corresponding to the reverse Tx parameter set. Examples of parameters for reverse Tx (e.g., reception) resource selection may include a priority of reception parameter (e.g., a reverse-direction transmission parameter, which may be referred to as $p_j^{reverse}$) a periodicity parameter, a frequency parameter, an interleaving pattern parameter, any of the other parameters described previously, or any combination of these.

Upon receiving resource selection trigger 315 at the PHY layer at the UE (e.g., after duration $T_1$ 340, which may be relatively short in duration), the PHY layer may calculate, select, or otherwise determine a set of available resources, or resources and directions, for the decided forward transmission, reverse transmission, or both, during the resource selection window 310 (e.g., a duration that may be duration $T_2$ 345 minus the duration $T_1$ 340). The UE, at the PHY layer, may then provide the UE MAC layer with the set of available resources or resources and directions. The UE, at the PHY layer, may perform such resource selection based on the information (e.g., including the parameters) indicated by the MAC layer, the resources and directions indicated in SCI 325, which may have been received during the sensing window 305, or both. For example, the UE may determine the available resources and directions by refraining from selecting resources corresponding to, for reverse direction selection, forward Tx resources 320 and, for forward direction selection, reverse Tx resources 335. That is, the other UE's (e.g., that transmitted SCI 325) reserved forward Tx resources 320 may cause interference to the UE's (e.g., that received SCI 325) reverse transmission if both transmissions use the same resource. Further, the UE's forward transmission may cause interference to the other UE's reserved reverse Tx resources 335 if both transmissions use the same resource. However, in some cases, the UE may determine that resources and directions that would normally cause such interference may be available to reserve if SCI 325 was received with a relatively low RSRP (e.g., the UE and the other UE are relatively far away from each other).

In some examples, the UE may be able to determine resources for availability that may otherwise cause interference if the UE receives an SCI with a relatively low RSRP. For example, the UE may determine that it may be able to reverse-transmit (e.g., receive) communications using resources corresponding to forward Tx resources 320, and may be able to transmit communications using resources corresponding to reverse Tx resources 335 if SCI 325 is received with a relatively low RSRP. For example, if the UE receives SCI 325 with an RSRP value that is less than or equal to a threshold value output of function $Th_{forward}$ ($p_i^{reverse}$, $p_j^{forward}$) (e.g., the UE makes a comparison), then the UE may be able to reserve resources corresponding to reverse Tx resources 335 for a forward direction transmission by the UE. $p_i^{reverse}$ may be a priority of reverse Tx resources 335 (e.g., one or more resources), and $p_j^{forward}$ may be a priority of a forward transmission by the UE. In some other examples, if the UE receives SCI 325 with an RSRP value that is less than or equal to a threshold value output of function $Th_{reverse}$ ($p_i^{forward}$, $p_j^{reverse}$) (e.g., the UE makes a comparison), then the UE may be able to reserve resources corresponding to forward Tx resources 320 for a reverse direction transmission by the UE. $p_i^{forward}$ may be a priority of forward Tx resources 320 (e.g., one or more resources), and $p_j^{reverse}$ may be a priority of a reverse transmission by the UE. The UE may perform such threshold functions, which may compare the priority inputs of the function in various ways as detailed further.

The function $Th_{forward}$ ($p_i^{reverse}$, $p_j^{forward}$) may be defined as:

$$Th_{forward}(p_i^{reverse}, p_j^{forward}) = \begin{cases} \alpha \text{ if } p_j^{forward} < p_i^{reverse} \\ -\infty \text{ else} \end{cases} \quad (1)$$

In some cases, α may be a predefined value (e.g., a maximum interference). In some cases, subscript "j" may refer to the UE determining to transmit, and subscript "i" may refer to the other UE (e.g., that transmitted SCI 325). In some cases, a lower priority value may indicate a higher importance of an associated transmission. Thus, Equation 1 may describe that if the UE's forward transmission is of higher importance compared to another UE's reverse transmission (e.g., using reverse Tx resources 335), then the UE may transmit in the forward direction using resources corresponding to reverse Tx resources 335 even if the UE's transmission causes some interference (e.g., to the other UE's reception using the reverse Tx resources 335), or the function may output a and if the received SCI 325 RSRP is less than or equal to α, then the UE may transmit using resources corresponding to the reverse Tx resources 335. Else, if the UE's forward transmission is of lower importance compared to the other UE's reverse transmission (e.g., using reverse Tx resources 335), then the UE may not transmit using the resources corresponding to the reverse Tx resources 335.

In some other examples, the function $Th_{forward}(p_i^{reverse}, p_j^{forward})$ may be defined as:

$$Th_{forward}(p_i^{reverse}, p_j^{forward}) = \begin{cases} \alpha \times (p_i^{reverse} - p_j^{forward}) \text{ if } p_j^{forward} < p_i^{reverse} \\ -\infty \text{ else} \end{cases} \quad (2)$$

Equation 2 may include one or more similar features as described with respect to Equation 1. Equation 2 may output a different threshold than Equation 1, and may depend on a greater importance of the UE's forward transmission relative to the other UE's reverse transmission (e.g., using the reverse Tx resources 335). That is, a low (e.g., more important) $p_j^{forward}$ value relative to $p_i^{reverse}$ may result in a higher output threshold value, which may result in the UE being more likely to be able to transmit using corresponding resources to the reverse Tx resources 335.

In some other examples, the function $Th_{forward}(p_i^{reverse}, p_j^{forward})$ may be defined as:

$$Th_{forward}(p_i^{reverse}, p_j^{forward}) = \alpha \quad (3)$$

Equation 3 may describe that the function may output a threshold value that may not depend on priority values $p_i^{reverse}$ and $p_j^{forward}$. Thus, if a received RSRP of SCI 325 is less than or equal to α, the UE may be able to transmit using corresponding resources to the reverse Tx resources 335 without significant interference at the other UE.

The function $Th_{reverse}$ ($p_i^{forward}$, $p_j^{reverse}$) may be defined as:

$$Th_{reverse}(p_i^{forward}, p_j^{reverse}) = \begin{cases} \alpha \text{ if } p_j^{reverse} < p_i^{forward} \\ -\infty \text{ else} \end{cases} \quad (4)$$

In some cases, α may be a predefined value (e.g., a maximum interference that the UE may experience from a transmission from another UE). In some cases, subscript "j" may refer to the UE determining to receive, and subscript "i" may refer to the other UE (e.g., that transmitted SCI 325). In some cases, a lower priority value may indicate a higher importance of an associated transmission. Thus, Equation 4 may describe that if the UE's reverse transmission is of higher importance compared to another UE's forward transmission (e.g., using forward Tx resources 320), then the function may output a. If the received SCI 325 RSRP is less than or equal to α, then the UE may receive using the resources corresponding to the forward Tx resources 320, and may additionally or alternatively attempt to protect reception from interference caused by the other UE's forward transmission (e.g., using the forward Tx resources 320). Else, if the UE's reverse transmission is of lower importance compared to the other UE's forward transmission (e.g., using forward Tx resources 320), then the UE may not receive using the resources corresponding to the forward Tx resources 320.

In some other examples, the function $\text{Th}_{reverse}(p_i^{forward}, p_j^{reverse})$ may be defined as:

$$Th_{reverse}\left(p_i^{forward}, p_j^{reverse}\right) = \qquad (5)$$
$$\begin{cases} \alpha \div \left(p_i^{forward} - p_j^{reverse}\right) & \text{if } p_j^{reverse} < p_i^{forward} \\ -\infty & \text{else} \end{cases}$$

Equation 5 may include one or more similar features as described with respect to Equation 4. Equation 5 may output a different threshold than Equation 4, and may depend on a greater importance of the UE's reverse transmission relative to the other UE's forward transmission (e.g., using the forward Tx resources 320). That is, a low (e.g., more important) $p_j^{reverse}$ value relative to $p_i^{forward}$ may result in a lower output threshold value, and the UE may attempt to protect reception from interference caused by the other UE's forward transmission using the forward Tx resources 320.

In some other examples, the function $\text{Th}_{reverse}(p_i^{forward}, p_j^{reverse})$ may be defined as:

$$Th_{reverse}(p_i^{forward}, p_j^{reverse}) = \alpha \qquad (6)$$

Equation 6 may describe that the function may output a threshold value that may not depend on priority values $p_i^{forward}$ and $p_j^{reverse}$. Thus, if a received RSRP of SCI 325 is less than or equal to $\alpha$, the UE may be able to receive using corresponding resources to the forward Tx resources 320 without significant interference at the UE.

When the UE, via the MAC layer, obtains the set of available resources from the PHY layer, the UE, via the MAC layer, may create a sidelink grant by choosing one or more resources of the set of available resources for a forward transmission, reverse transmission, or both. The UE may transmit a sidelink control message (e.g., an SCI) to one or more other UEs that includes the chosen (e.g., selected) resources, associated directionalities, one or more parameters, or a combination thereof, among other information. The UE may then communicate with another UE (e.g., transmit sidelink communications in a forward direction with respect to the UE, receive sidelink communications in a reverse direction with respect to the UE, and the like) using the chosen resources and directionalities.

Figure 4:
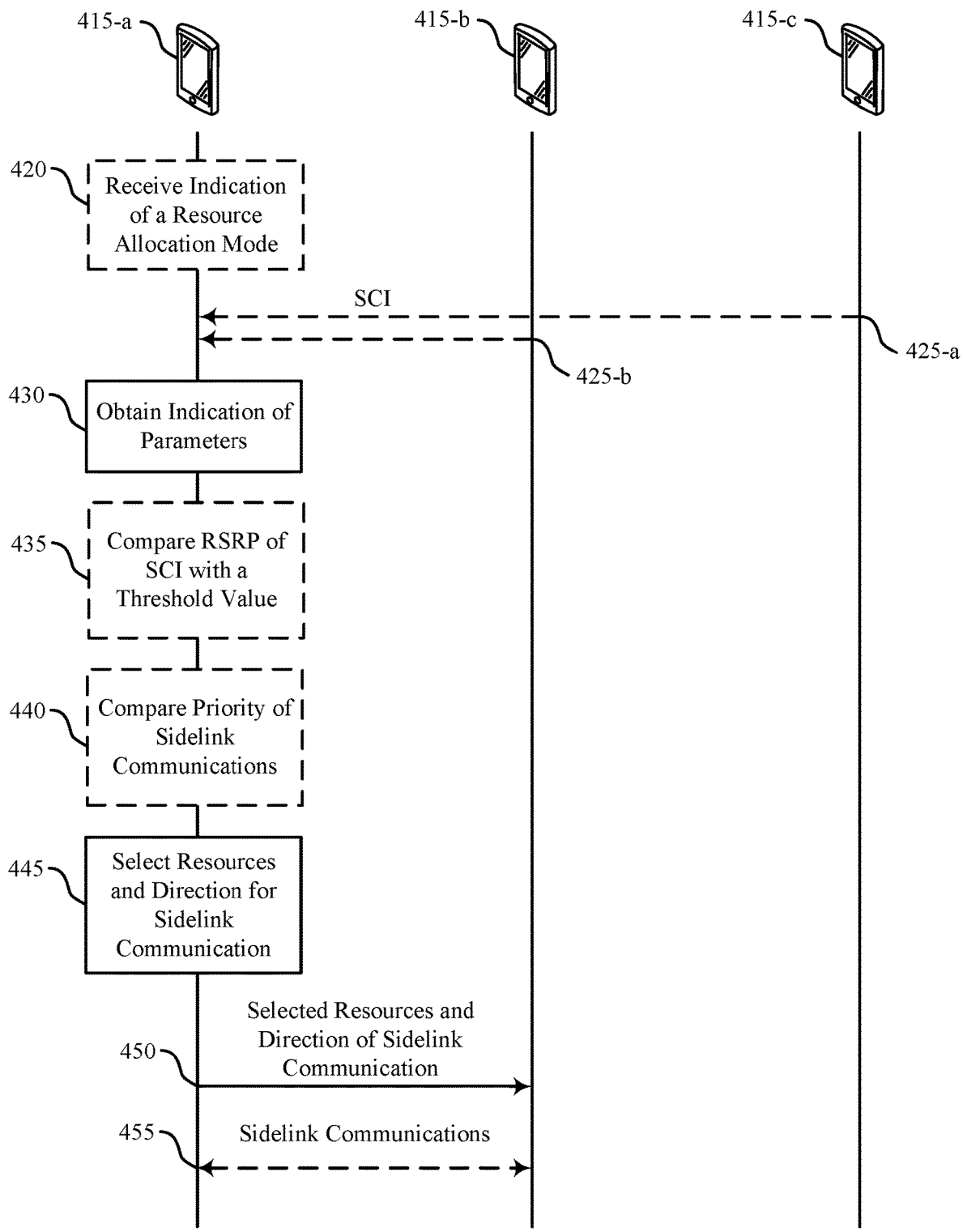
FIG. 4 illustrates an example of a process flow that supports bi-directional sidelink resource selection with bi-directional resource allocation indication in accordance with aspects of the present disclosure.

FIG. 4 illustrates an example of a process flow 400 that supports techniques for bi-directional sidelink resource selection with bi-directional resource allocation indication in accordance with aspects of the present disclosure. The process flow 400 may implement or be implemented by aspects of the wireless communications system 100, wireless communications system 200, or a combination of these, as described with reference to FIG. 1 and FIG. 2. In some examples, the process flow 400 may include example operations associated with one or more UEs 415, which may be examples of corresponding devices described with reference to FIGS. 1 and 2. In the following description of the process flow 400, the operations between the UEs 415 may be performed in a different order than the example order shown, or the operations performed by the UEs 415 may be performed in different orders or at different times. Some operations may also be omitted from the process flow 400, and other operations may be added to the process flow 400.

At 420, UE 415-a may receive control signaling indicating a resource allocation mode for sidelink communications. In some examples, UE 415-a may receive the control signaling from a base station, or another wireless device. In some examples, the control signaling may be received in an RRC message. In some examples, the resource allocation mode may be a Mode 2.

At 425-a, UE 415-a may receive an SCI from UE 415-c, the SCI indicating a second set of resources for a second sidelink communication having a second direction that is one of a forward direction or a reverse direction. In some examples, the SCI may include a direction indicator identifying the second direction of the second sidelink communication.

At 425-b, UE 415-a may receive an SCI from UE 415-b, the SCI indicating the second set of resources for the second sidelink communication having the second direction that is one of the forward direction or the reverse direction. In some examples, the SCI may include the direction indicator identifying the second direction of the second sidelink communication.

In some examples, UE 415-a may be a first PLC, a first S/A, or any combination of these. In some examples, UE 415-b may be a second PLC, a second S/A, or any combination of these. In some examples, UE 415-c may be a third PLC, a third S/A, or any combination of these.

At 430, UE 415-a may obtain, at a first protocol layer of UE 415-a from a second protocol layer of UE 415-a, an indication of a first set of parameters for the forward direction of a sidelink with UE 415-b and a second set of parameters for the reverse direction of the sidelink, where the first set of parameters and the second set of parameters are obtained based on the control signaling. In some examples, the first protocol layer may include a PHY layer and the second protocol layer may include a MAC layer.

In some examples, at least one parameter of the first set of parameters and the second set of parameters may have a same value. In some examples, the at least one parameter may include a resource pool, a quantity of sub-channels to be used for a sidelink communication, or both. In some examples, at least one parameter of the first set of parameters and the second set of parameters may have different values. In some examples, the at least one parameter may include a resource pool, a quantity of sub-channels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination of these.

At 435, UE 415-a may compare an RSRP of the SCI with a threshold value. In some examples, the threshold value may be $\text{Th}_{forward}$ or $\text{Th}_{reverse}$. In some examples, the threshold value may be a function of one or more sidelink communication priorities.

At 440, UE 415-a may compare a first priority of the sidelink communication with a second priority of the second sidelink communication, the second priority indicated in the received SCI. In some examples, UE 415-a may compare the priorities to determine the threshold value.

At 445, UE 415-a may select, for the sidelink communication having a direction that is one of the forward direction or the reverse direction, a set of resources for the sidelink communication based on the direction of the sidelink communication and one of the first set of parameters or the second set of parameters that correspond to the direction of the sidelink communication. In some examples, the set of resources for the sidelink communication may be selected based on the second direction of the second sidelink communication. In some examples, the set of resources for the sidelink communication may be selected based on the comparing the RSRP, comparing the priorities, or both.

At 450, UE 415-*a* may transmit a sidelink control message (e.g., a second SCI) to UE 415-*b*, the sidelink control message indicating the selected set of resources for the sidelink communication and the direction of the sidelink communication.

At 455, UE 415-*a* may transmit the sidelink communication to UE 415-*b* in the selected set of resources based on the transmitted sidelink control message, where the direction of the sidelink communication may be the forward direction. In some other examples, UE 415-*a* may receive the sidelink communication from UE 415-*b* in the selected set of resources based on the transmitted sidelink control message, where the direction of the sidelink communication may be the reverse direction.

Figure 5:
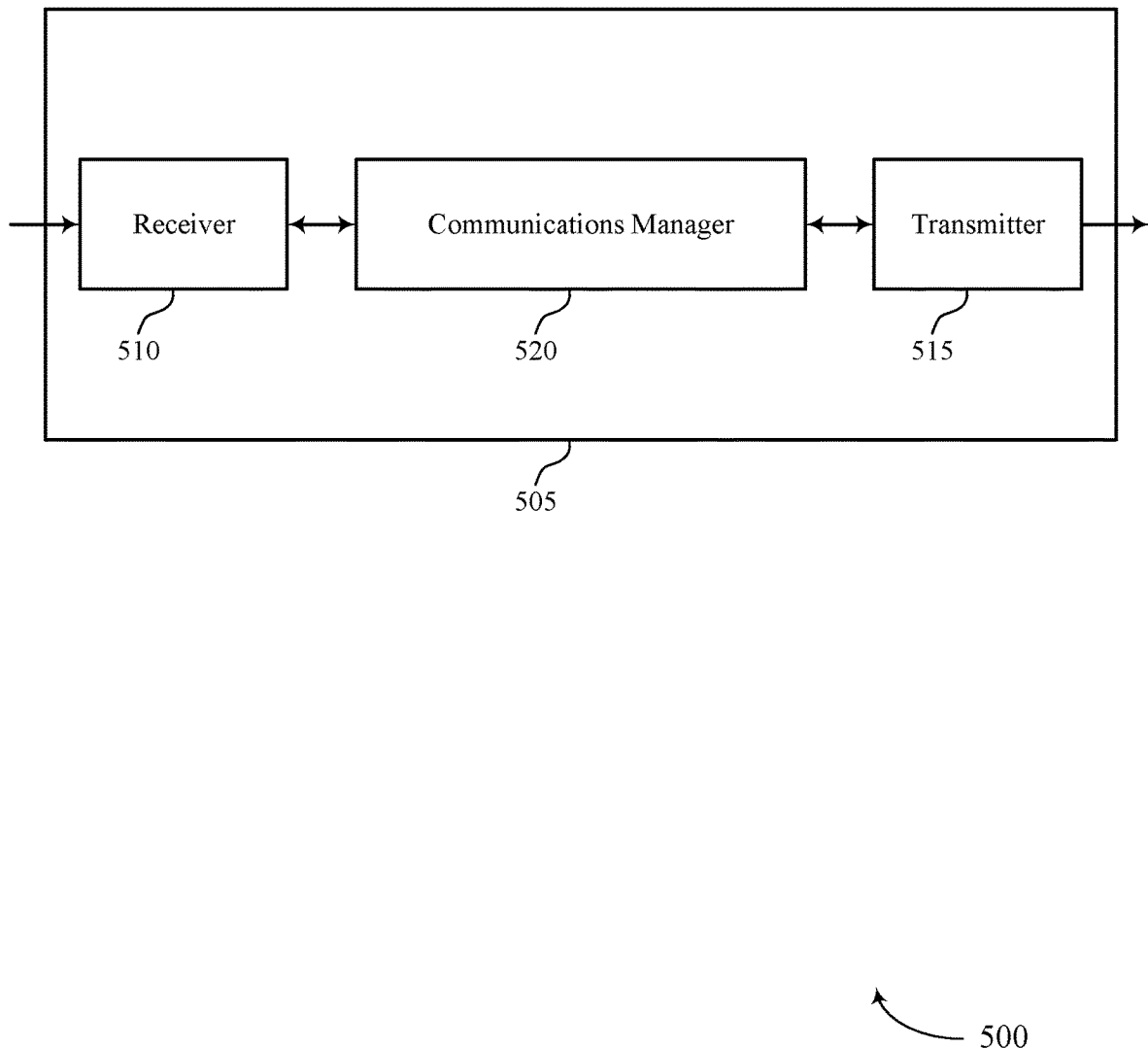
FIGS. 5 and 6 show block diagrams of devices that support bi-directional sidelink resource selection with bi-directional resource allocation indication in accordance with aspects of the present disclosure.

FIG. 5 shows a block diagram 500 of a device 505 that supports bi-directional sidelink resource selection with bi-directional resource allocation indication in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the bi-directional sidelink resource selection with bi-directional resource allocation indication features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to bi-directional sidelink resource selection with bi-directional resource allocation indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to bi-directional sidelink resource selection with bi-directional resource allocation indication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of bi-directional sidelink resource selection with bi-directional resource allocation indication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for obtaining, at a first protocol layer of the first UE from a second protocol layer of the first UE, an indication of a first set of parameters for a forward direction of a sidelink with a second UE and a second set of parameters for a reverse direction of the sidelink. The communications manager 520 may be configured as or otherwise support a means for selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication. The communications manager 520 may be configured as or otherwise support a means for transmitting a sidelink control message to the second UE, the sidelink control message indicating the selected set of resources for the sidelink communication and the direction of the sidelink communication.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
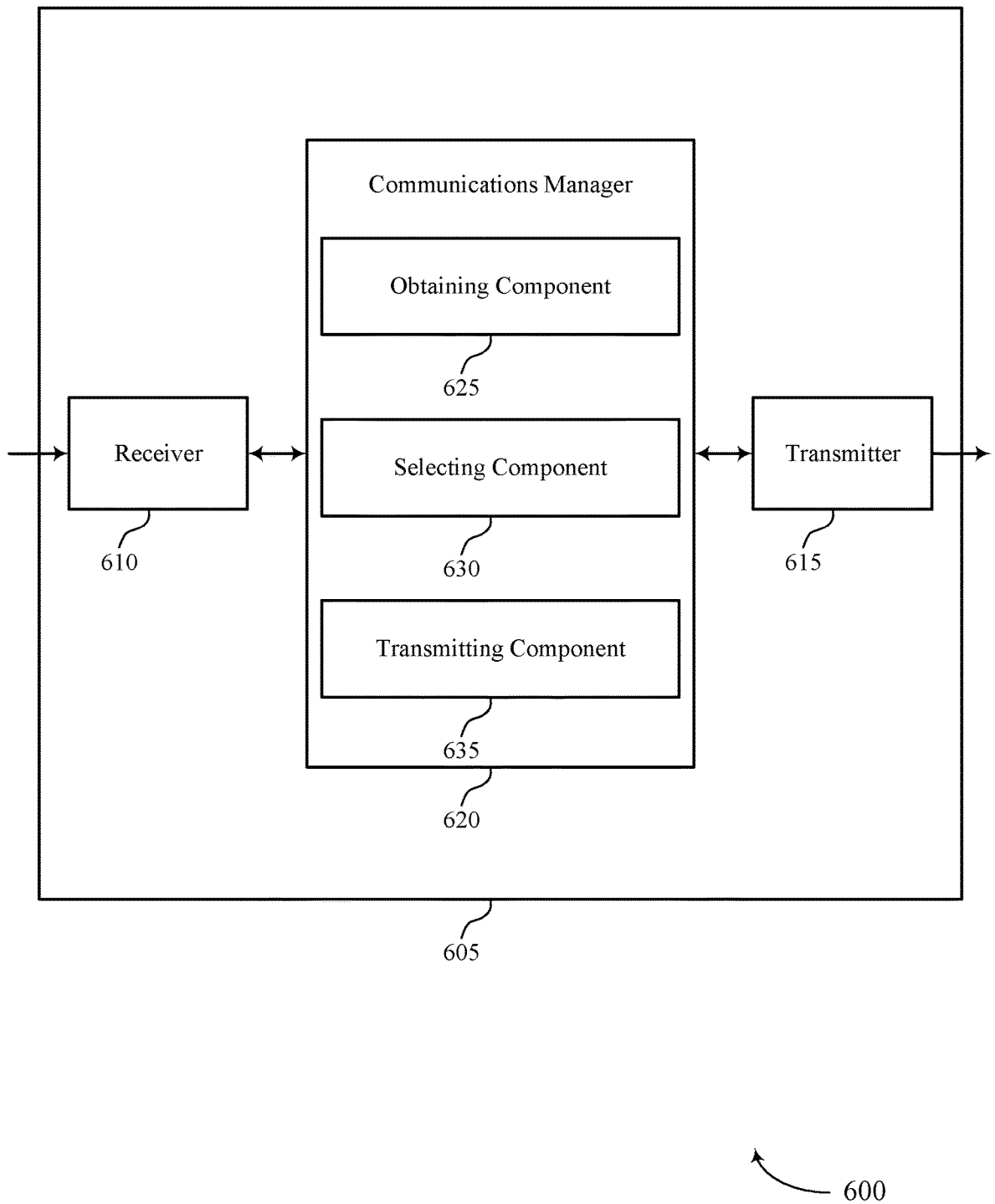

FIG. 6 shows a block diagram 600 of a device 605 that supports bi-directional sidelink resource selection with bi-directional resource allocation indication in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to bi-directional sidelink resource selection with bi-directional resource allocation indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to bi-directional sidelink resource selection with bi-directional resource allocation indication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of bi-directional sidelink resource selection with bi-directional resource allocation indication as described herein. For example, the communications manager 620 may include an obtaining component 625, a selecting component 630, a transmitting component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The obtaining component 625 may be configured as or otherwise support a means for obtaining, at a first protocol layer of the first UE from a second protocol layer of the first UE, an indication of a first set of parameters for a forward direction of a sidelink with a second UE and a second set of parameters for a reverse direction of the sidelink. The selecting component 630 may be configured as or otherwise support a means for selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication. The transmitting component 635 may be configured as or otherwise support a means for transmitting a sidelink control message to the second UE, the sidelink control message indicating the selected set of resources for the sidelink communication and the direction of the sidelink communication.

In some cases, the obtaining component 625, the selecting component 630, and the transmitting component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the obtaining component 625, the selecting component 630, and the transmitting component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
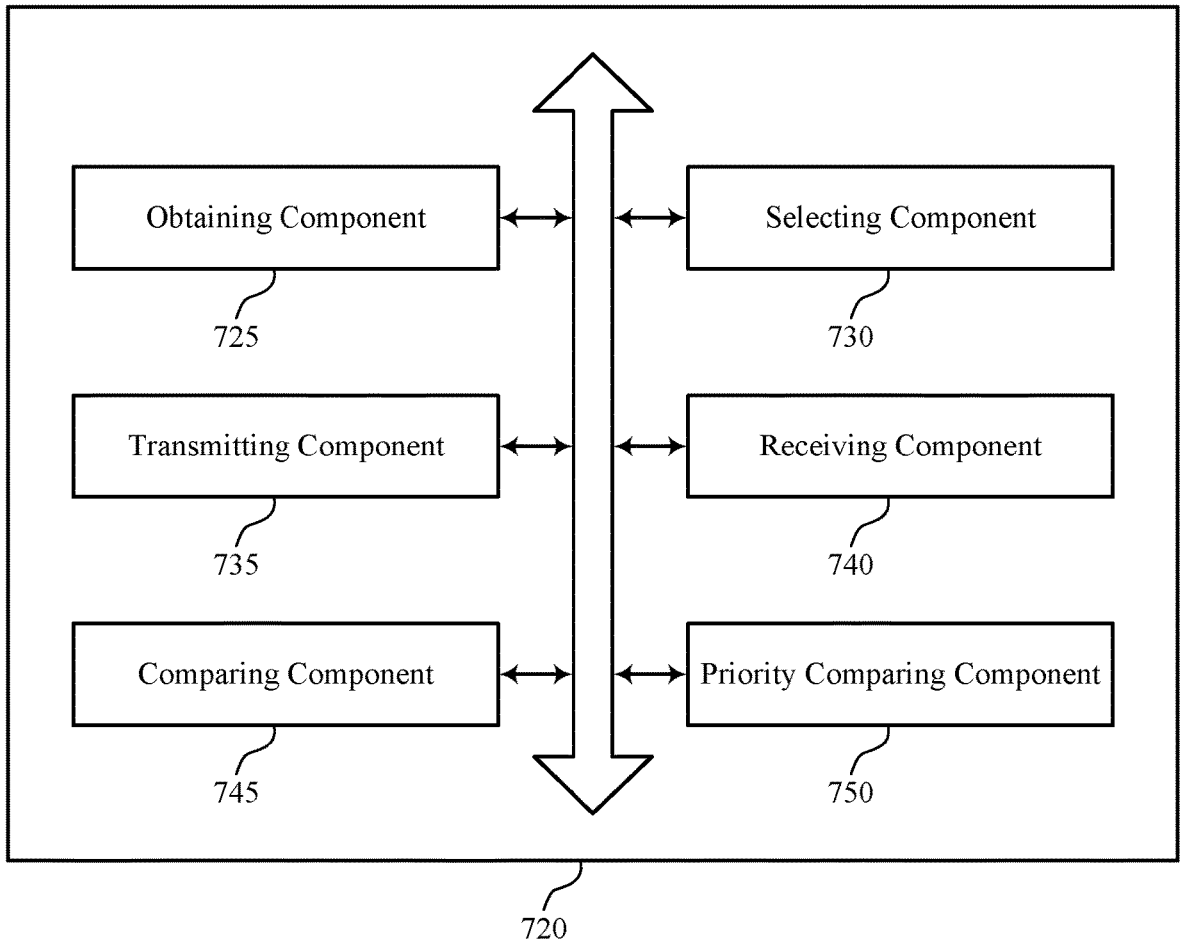
FIG. 7 shows a block diagram of a communications manager that supports bi-directional sidelink resource selection with bi-directional resource allocation indication in accordance with aspects of the present disclosure.

FIG. 7 shows a block diagram 700 of a communications manager 720 that supports bi-directional sidelink resource selection with bi-directional resource allocation indication in accordance with aspects of the present disclosure. The communications manager 720 may be an example of aspects of a communications manager 520, a communications manager 620, or both, as described herein. The communications manager 720, or various components thereof, may be an example of means for performing various aspects of bi-directional sidelink resource selection with bi-directional resource allocation indication as described herein. For example, the communications manager 720 may include an obtaining component 725, a selecting component 730, a transmitting component 735, a receiving component 740, a comparing component 745, a priority comparing component 750, or any combination thereof. Each of these components may communicate, directly or indirectly, with one another (e.g., via one or more buses).

The communications manager 720 may support wireless communications at a first UE in accordance with examples as disclosed herein. The obtaining component 725 may be configured as or otherwise support a means for obtaining, at a first protocol layer of the first UE from a second protocol layer of the first UE, an indication of a first set of parameters for a forward direction of a sidelink with a second UE and a second set of parameters for a reverse direction of the sidelink. The selecting component 730 may be configured as or otherwise support a means for selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication. The transmitting component 735 may be configured as or otherwise support a means for transmitting a sidelink control message to the second UE, the sidelink control message indicating the selected set of resources for the sidelink communication and the direction of the sidelink communication.

In some examples, the receiving component 740 may be configured as or otherwise support a means for receiving an SCI from a third UE, the SCI indicating a second set of resources for a second sidelink communication having a second direction that is one of the forward direction or the reverse direction, where the set of resources for the sidelink communication is selected based on the second direction of the second sidelink communication.

In some examples, the comparing component 745 may be configured as or otherwise support a means for comparing an RSRP of the SCI with a threshold value, where the set of resources for the sidelink communication is selected based on the comparing.

In some examples, the priority comparing component 750 may be configured as or otherwise support a means for comparing a first priority of the sidelink communication with a second priority of the second sidelink communication, the second priority indicated in the received SCI, where the set of resources for the sidelink communication is selected based on the comparing.

In some examples, the SCI includes a direction indicator identifying the second direction of the second sidelink communication.

In some examples, at least one parameter of the first set of parameters and the second set of parameters have a same value.

In some examples, the at least one parameter includes a resource pool, a quantity of sub-channels to be used for the sidelink communication, or both.

In some examples, at least one parameter of the first set of parameters and the second set of parameters have different values.

In some examples, the at least one parameter includes a resource pool, a quantity of sub-channels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination thereof.

In some examples, the receiving component 740 may be configured as or otherwise support a means for receiving control signaling indicating a resource allocation mode for sidelink communications, where the first set of parameters and the second set of parameters are obtained based on the control signaling.

In some examples, the control signaling is received in an RRC message.

In some examples, the receiving component 740 may be configured as or otherwise support a means for receiving the sidelink communication from the second UE in the selected set of resources based on the transmitted sidelink control message, where the direction of the sidelink communication is the reverse direction.

In some examples, the transmitting component 735 may be configured as or otherwise support a means for transmitting the sidelink communication to the second UE in the selected set of resources based on the transmitted sidelink control message, where the direction of the sidelink communication is the forward direction.

In some examples, the first protocol layer includes a PHY layer and the second protocol layer includes a MAC layer.

In some examples, the first UE includes a first PLC, a first S/A, or any combination thereof, and the second UE includes a second PLC, a second S/A, or any combination thereof.

In some cases, the obtaining component 725, the selecting component 730, the transmitting component 735, the receiving component 740, the comparing component 745, and the priority comparing component 750 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the obtaining component 725, the selecting component 730, the transmitting component 735, the receiving component 740, the comparing component 745, and the priority comparing component 750 discussed herein.

Figure 8:
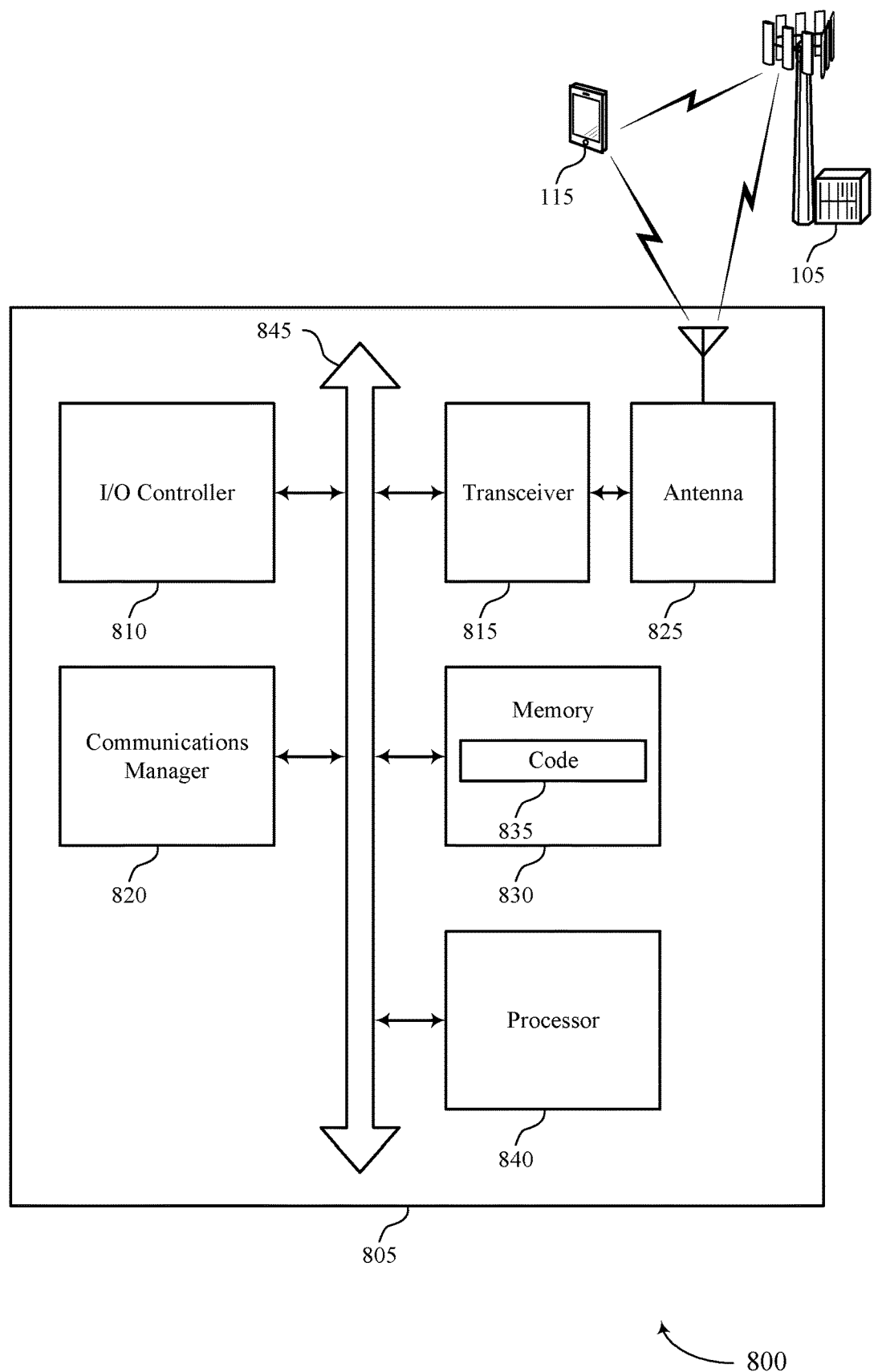
FIG. 8 shows a diagram of a system including a device that supports bi-directional sidelink resource selection with bi-directional resource allocation indication in accordance with aspects of the present disclosure.

FIG. 8 shows a diagram of a system 800 including a device 805 that supports bi-directional sidelink resource selection with bi-directional resource allocation indication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting bi-directional sidelink resource selection with bi-directional resource allocation indication). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for obtaining, at a first protocol layer of the first UE from a second protocol layer of the first UE, an indication of a first set of parameters for a forward direction of a sidelink with a second UE and a second set of parameters for a reverse direction of the sidelink. The communications manager 820 may be configured as or otherwise support a means for selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication. The communications manager 820 may be configured as or otherwise support a means for transmitting a sidelink control message to the second UE, the sidelink control message indicating the selected set of resources for the sidelink communication and the direction of the sidelink communication.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of bi-directional sidelink resource selection with bi-directional resource allocation indication as described herein, or the processor 840 and the memory 830 may be otherwise configured to perform or support such operations.

Figure 9:
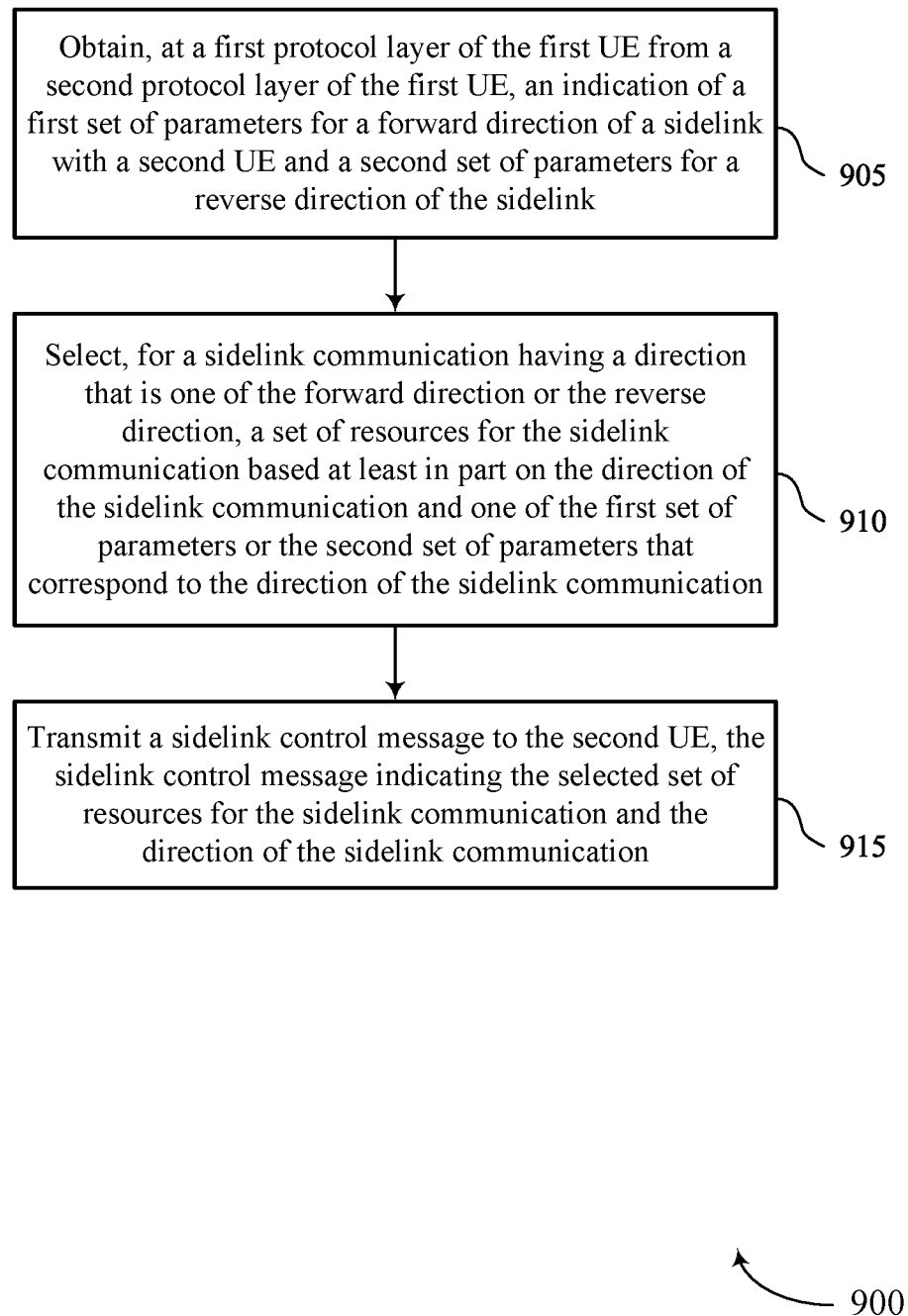
FIGS. 9 through 11 show flowcharts illustrating methods that support bi-directional sidelink resource selection with bi-directional resource allocation indication in accordance with aspects of the present disclosure.

FIG. 9 shows a flowchart illustrating a method 900 that supports bi-directional sidelink resource selection with bi-directional resource allocation indication in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include obtaining, at a first protocol layer of the first UE from a second protocol layer of the first UE, an indication of a first set of parameters for a forward direction of a sidelink with a second UE and a second set of parameters for a reverse direction of the sidelink. The operations of 905 may be performed in accordance with examples as disclosed herein. In some examples, aspects of the operations of 905 may be performed by an obtaining component 725 as described with reference to FIG. 7.

At 910, the method may include selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication. The operations of 910 may be performed in accordance with examples as disclosed herein. In some examples, aspects of the operations of 910 may be performed by a selecting component 730 as described with reference to FIG. 7.

At 915, the method may include transmitting a sidelink control message to the second UE, the sidelink control message indicating the selected set of resources for the sidelink communication and the direction of the sidelink communication. The operations of 915 may be performed in accordance with examples as disclosed herein. In some examples, aspects of the operations of 915 may be performed by a transmitting component 735 as described with reference to FIG. 7.

Figure 10:
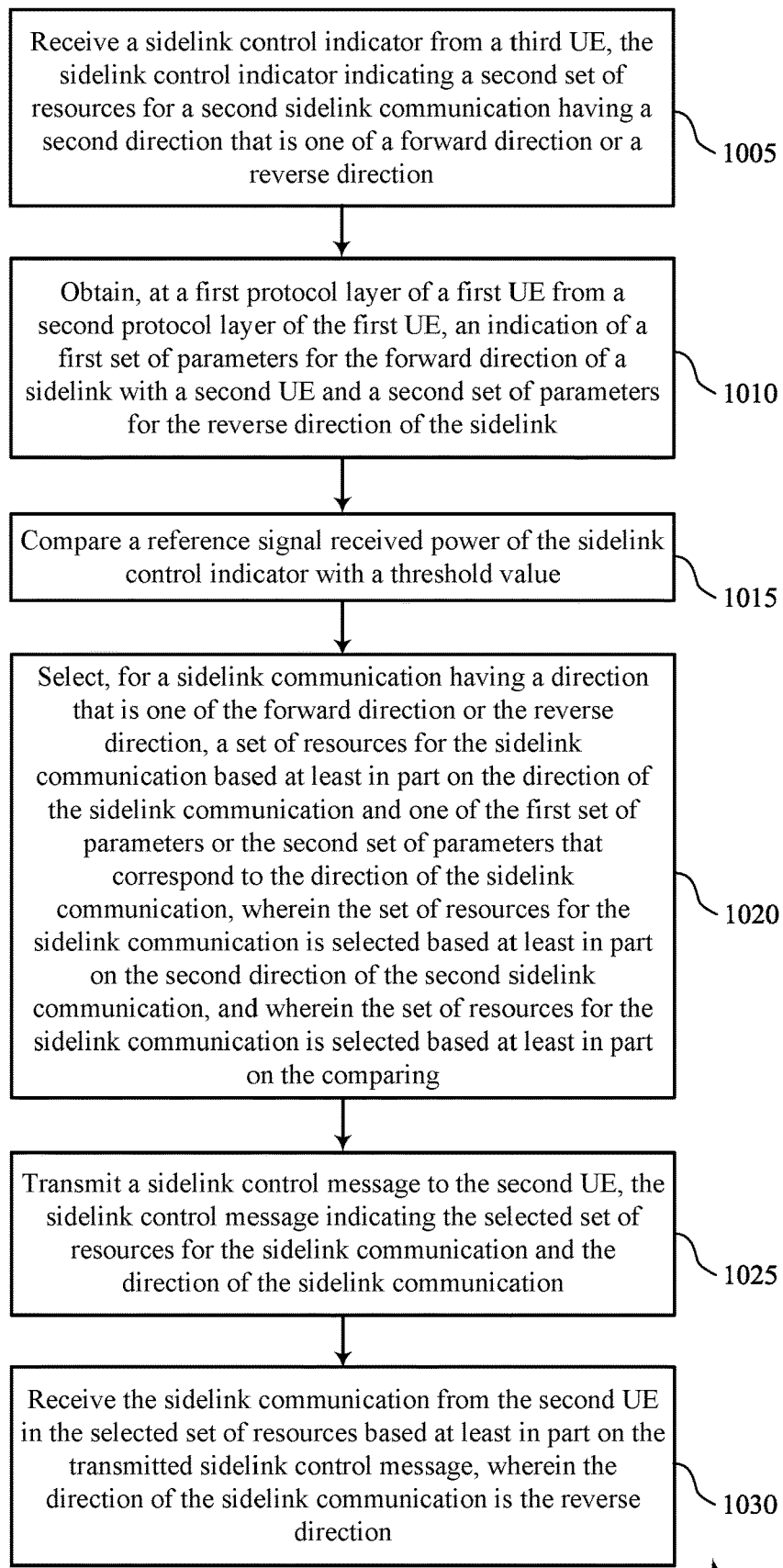

FIG. 10 shows a flowchart illustrating a method 1000 that supports bi-directional sidelink resource selection with bi-directional resource allocation indication in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving an SCI from a third UE, the SCI indicating a second set of resources for a second sidelink communication having a second direction that is one of a forward direction or a reverse direction. The operations of 1005 may be performed in accordance with examples as disclosed herein. In some examples, aspects of the operations of 1005 may be performed by a receiving component 740 as described with reference to FIG. 7.

At 1010, the method may include obtaining, at a first protocol layer of a first UE from a second protocol layer of the first UE, an indication of a first set of parameters for the forward direction of a sidelink with a second UE and a second set of parameters for the reverse direction of the sidelink. The operations of 1010 may be performed in accordance with examples as disclosed herein. In some examples, aspects of the operations of 1010 may be performed by an obtaining component 725 as described with reference to FIG. 7.

At 1015, the method may include comparing an RSRP of the SCI with a threshold value. The operations of 1015 may be performed in accordance with examples as disclosed herein. In some examples, aspects of the operations of 1015 may be performed by a comparing component 745 as described with reference to FIG. 7.

At 1020, the method may include selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, where the set of resources for the sidelink communication is selected based on the second direction of the second sidelink communication, and where the set of resources for the sidelink communication is selected based on the comparing. The operations of 1020 may be performed in accordance with examples as disclosed herein. In some examples, aspects of the operations of 1020 may be performed by a selecting component 730 as described with reference to FIG. 7.

At 1025, the method may include transmitting a sidelink control message to the second UE, the sidelink control message indicating the selected set of resources for the sidelink communication and the direction of the sidelink communication. The operations of 1025 may be performed in accordance with examples as disclosed herein. In some examples, aspects of the operations of 1025 may be performed by a transmitting component 735 as described with reference to FIG. 7.

At 1030, the method may include receiving the sidelink communication from the second UE in the selected set of resources based on the transmitted sidelink control message, where the direction of the sidelink communication is the reverse direction. The operations of 1030 may be performed in accordance with examples as disclosed herein. In some examples, aspects of the operations of 1030 may be performed by a receiving component 740 as described with reference to FIG. 7.

Figure 11:
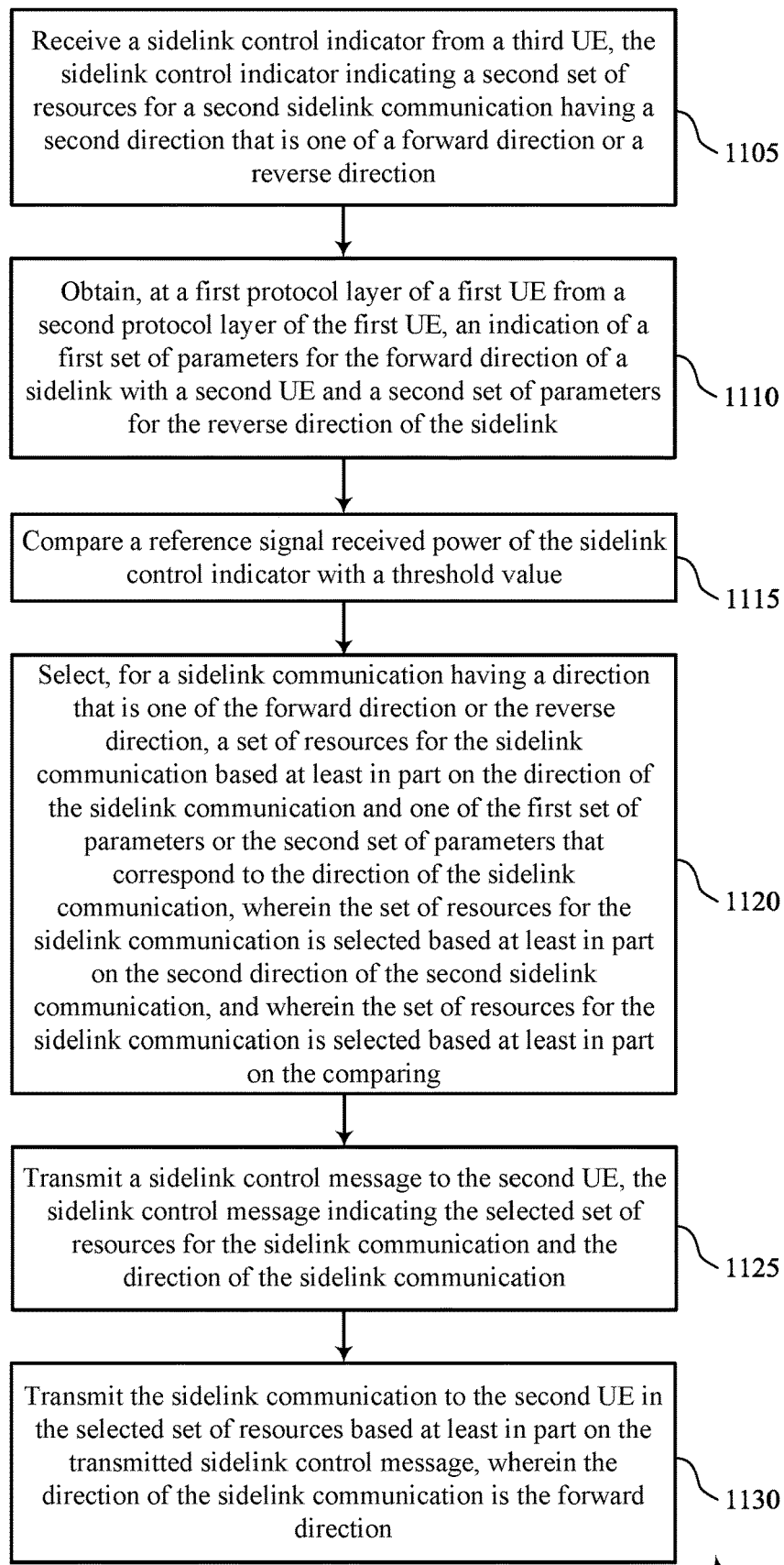

FIG. 11 shows a flowchart illustrating a method 1100 that supports bi-directional sidelink resource selection with bi-directional resource allocation indication in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving an SCI from a third UE, the SCI indicating a second set of resources for a second sidelink communication having a second direction that is one of a forward direction or a reverse direction. The operations of 1105 may be performed in accordance with examples as disclosed herein. In some examples, aspects of the operations of 1105 may be performed by a receiving component 740 as described with reference to FIG. 7.

At 1110, the method may include obtaining, at a first protocol layer of a first UE from a second protocol layer of the first UE, an indication of a first set of parameters for the forward direction of a sidelink with a second UE and a second set of parameters for the reverse direction of the sidelink. The operations of 1110 may be performed in accordance with examples as disclosed herein. In some examples, aspects of the operations of 1110 may be performed by an obtaining component 725 as described with reference to FIG. 7.

At 1115, the method may include comparing an RSRP of the SCI with a threshold value. The operations of 1115 may be performed in accordance with examples as disclosed herein. In some examples, aspects of the operations of 1115 may be performed by a comparing component 745 as described with reference to FIG. 7.

At 1120, the method may include selecting, for a sidelink communication having a direction that is one of the forward direction or the reverse direction, a set of resources for the sidelink communication based on the direction of the sidelink communication and one of the first set of parameters or the second set of parameters that correspond to the direction of the sidelink communication, where the set of resources for the sidelink communication is selected based on the second direction of the second sidelink communication, and where the set of resources for the sidelink communication is selected based on the comparing. The operations of 1120 may be performed in accordance with examples as disclosed herein. In some examples, aspects of the operations of 1120 may be performed by a selecting component 730 as described with reference to FIG. 7.

At 1125, the method may include transmitting a sidelink control message to the second UE, the sidelink control message indicating the selected set of resources for the sidelink communication and the direction of the sidelink communication. The operations of 1125 may be performed in accordance with examples as disclosed herein. In some examples, aspects of the operations of 1125 may be performed by a transmitting component 735 as described with reference to FIG. 7.

At 1130, the method may include transmitting the sidelink communication to the second UE in the selected set of resources based on the transmitted sidelink control message, where the direction of the sidelink communication is the forward direction. The operations of 1130 may be performed in accordance with examples as disclosed herein. In some examples, aspects of the operations of 1130 may be performed by a transmitting component 735 as described with reference to FIG. 7.

The following provides an overview of aspects of the present disclosure:

Aspect 1: A method for wireless communications at a first UE, comprising: obtaining, at a first protocol layer of the first UE from a second protocol layer of the first UE, an indication of a first set of parameters for a forward direction of a sidelink with a second UE and a second set of parameters for a reverse direction of the sidelink; selecting, for a sidelink communication having a direction that is one of the forward direction or the reverse direction, a set of resources for the sidelink communication based at least in part on the direction of the sidelink communication and one of the first set of parameters or the second set of parameters that correspond to the direction of the sidelink communication; and transmitting a sidelink control message to the second UE, the sidelink control message indicating the selected set of resources for the sidelink communication and the direction of the sidelink communication.

Aspect 2: The method of aspect 1, further comprising: receiving a sidelink control indicator from a third UE, the sidelink control indicator indicating a second set of resources for a second sidelink communication having a second direction that is one of the forward direction or the reverse direction, wherein the set of resources for the sidelink communication is selected based at least in part on the second direction of the second sidelink communication.

Aspect 3: The method of aspect 2, further comprising: comparing a reference signal received power of the sidelink control indicator with a threshold value, wherein the set of resources for the sidelink communication is selected based at least in part on the comparing.

Aspect 4: The method of any of aspects 2 through 3, further comprising: comparing a first priority of the sidelink communication with a second priority of the second sidelink communication, the second priority indicated in the received sidelink control indicator, wherein the set of resources for the sidelink communication is selected based at least in part on the comparing.

Aspect 5: The method of any of aspects 2 through 4, wherein the sidelink control indicator comprises a direction indicator identifying the second direction of the second sidelink communication.

Aspect 6: The method of any of aspects 1 through 5, wherein at least one parameter of the first set of parameters and the second set of parameters have a same value.

Aspect 7: The method of aspect 6, wherein the at least one parameter comprises a resource pool, a quantity of subchannels to be used for the sidelink communication, or both.

Aspect 8: The method of any of aspects 1 through 7, wherein at least one parameter of the first set of parameters and the second set of parameters have different values.

Aspect 9: The method of aspect 8, wherein the at least one parameter comprises a resource pool, a quantity of subchannels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination thereof.

Aspect 10: The method of any of aspects 1 through 9, further comprising: receiving control signaling indicating a resource allocation mode for sidelink communications, wherein the first set of parameters and the second set of parameters are obtained based at least in part on the control signaling.

Aspect 11: The method of aspect 10, wherein the control signaling is received in a radio resource control message.

Aspect 12: The method of any of aspects 1 through 11, further comprising: receiving the sidelink communication from the second UE in the selected set of resources based at least in part on the transmitted sidelink control message, wherein the direction of the sidelink communication is the reverse direction.

Aspect 13: The method of any of aspects 1 through 12, further comprising: transmitting the sidelink communication to the second UE in the selected set of resources based at least in part on the transmitted sidelink control message, wherein the direction of the sidelink communication is the forward direction.

Aspect 14: The method of any of aspects 1 through 13, wherein the first protocol layer comprises a physical layer and the second protocol layer comprises a medium access control layer.

Aspect 15: The method of any of aspects 1 through 14, wherein the first UE comprises a first programmable logic controller, a first sensor/actuator, or any combination thereof, and the second UE comprises a second programmable logic controller, a second sensor/actuator, or any combination thereof.

Aspect 16: An apparatus for wireless communications at a first UE, comprising a processor; memory coupled with the processor; and instructions stored in the memory and executable by the processor to cause the apparatus to perform a method of any of aspects 1 through 15.

Aspect 17: An apparatus for wireless communications at a first UE, comprising at least one means for performing a method of any of aspects 1 through 15.

Aspect 18: A non-transitory computer-readable medium storing code for wireless communications at a first UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   obtaining, at a first protocol layer of the first UE from a second protocol layer of the first UE, an indication of a first set of parameters for communicating via a forward direction of a sidelink between the first UE and a second UE and a second set of parameters for communicating via a reverse direction of the sidelink between the second UE and the first UE;
   receiving a sidelink control indicator;
   comparing a reference signal received power of the sidelink control indicator with a threshold value;
   selecting, by the first UE for a sidelink communication having a direction that is one of the forward direction or the reverse direction, a set of resources for the sidelink communication based at least in part on the direction of the sidelink communication and the first set of parameters or the second set of parameters that correspond to the direction of the sidelink communication, wherein the set of resources for the sidelink communication is selected based at least in part on the comparison of the reference signal received power of the sidelink control indicator with the threshold value; and
   transmitting a sidelink control message to the second UE, the sidelink control message indicating the selected set of resources for the sidelink communication and the direction of the sidelink communication.

2. The method of claim 1, wherein the sidelink control indicator is received from a third UE, the sidelink control indicator indicating a second set of resources for a second sidelink communication having a second direction that is one of the forward direction or the reverse direction, wherein the set of resources for the sidelink communication is selected based at least in part on the second direction of the second sidelink communication.

3. A method for wireless communications at a first user equipment (UE), comprising:
   obtaining, at a first protocol layer of the first UE from a second protocol layer of the first UE, an indication of a first set of parameters for communicating via a forward direction of a sidelink between the first UE and a second UE and a second set of parameters for communicating via a reverse direction of the sidelink between the second UE and the first UE;

receiving a sidelink control indicator from a third UE, the sidelink control indicator indicating a second set of resources for a second sidelink communication having a second direction that is one of the forward direction or the reverse direction;

comparing a first priority of the sidelink communication with a second priority of the second sidelink communication, the second priority indicated in the received sidelink control indicator;

selecting, by the first UE for a sidelink communication having a direction that is one of the forward direction or the reverse direction, a set of resources for the sidelink communication based at least in part on the direction of the sidelink communication and the first set of parameters or the second set of parameters that correspond to the direction of the sidelink communication, wherein the set of resources for the sidelink communication is selected based at least in part on the second direction of the second sidelink communication, wherein the set of resources for the sidelink communication is selected based at least in part on the comparison of the first priority with the second priority; and transmitting a sidelink control message to the second UE, the sidelink control message indicating the selected set of resources for the sidelink communication and the direction of the sidelink communication.

4. The method of claim 2, wherein the sidelink control indicator comprises a direction indicator identifying the second direction of the second sidelink communication.

5. The method of claim 1, wherein at least one parameter of the first set of parameters has a same value as at least one parameter of the second set of parameters.

6. The method of claim 5, wherein the at least one parameter comprises a resource pool, a quantity of subchannels to be used for the sidelink communication, or both.

7. The method of claim 1, wherein at least one parameter of the first set of parameters has a different value than at least one parameter of the second set of parameters.

8. The method of claim 7, wherein the at least one parameter comprises a resource pool, a quantity of subchannels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination thereof.

9. The method of claim 1, further comprising:
receiving control signaling indicating a resource allocation mode for sidelink communications, wherein the first set of parameters and the second set of parameters are obtained based at least in part on the control signaling.

10. The method of claim 9, wherein the control signaling is received in a radio resource control message.

11. The method of claim 1, further comprising:
receiving the sidelink communication from the second UE in the selected set of resources based at least in part on the transmitted sidelink control message, wherein the direction of the sidelink communication is the reverse direction.

12. The method of claim 1, further comprising:
transmitting the sidelink communication to the second UE in the selected set of resources based at least in part on the transmitted sidelink control message, wherein the direction of the sidelink communication is the forward direction.

13. The method of claim 1, wherein the first protocol layer comprises a physical layer and the second protocol layer comprises a medium access control layer.

14. The method of claim 1, wherein the first UE comprises a first programmable logic controller, a first sensor/actuator, or any combination thereof.

15. An apparatus for wireless communications at a first user equipment (UE), comprising:
one or more processors; and
memory coupled with the one or more processors, the one or more processors configured to cause the apparatus to:
obtain, at a first protocol layer of the first UE from a second protocol layer of the first UE, an indication of a first set of parameters for communicating via a forward direction of a sidelink between the first UE and a second UE and a second set of parameters for communicating via a reverse direction of the sidelink between the second UE and the first UE;
receive a sidelink control indicator;
compare a reference signal received power of the sidelink control indicator with a threshold value;
select, by the first UE for a sidelink communication having a direction that is one of the forward direction or the reverse direction, a set of resources for the sidelink communication based at least in part on the direction of the sidelink communication and the first set of parameters or the second set of parameters that correspond to the direction of the sidelink communication, wherein the set of resources for the sidelink communication is selected based at least in part on the comparison of the reference signal received power of the sidelink control indicator with the threshold value; and
transmit a sidelink control message to the second UE, the sidelink control message indicating the selected set of resources for the sidelink communication and the direction of the sidelink communication.

16. The apparatus of claim 15, the one or more processors further configured to cause the apparatus to:
receive the sidelink control indicator from a third UE, the sidelink control indicator indicating a second set of resources for a second sidelink communication having a second direction that is one of the forward direction or the reverse direction, wherein the set of resources for the sidelink communication is selected based at least in part on the second direction of the second sidelink communication.

17. An apparatus for wireless communications at a first user equipment (UE), comprising:
one or more processors; and
memory coupled with the one or more processors, the one or more processors configured to cause the apparatus to:
obtain, at a first protocol layer of the first UE from a second protocol layer of the first UE, an indication of a first set of parameters for communicating via a forward direction of a sidelink between the first UE and a second UE and a second set of parameters for communicating via a reverse direction of the sidelink between the second UE and the first UE;
receive a sidelink control indicator from a third UE, the sidelink control indicator indicating a second set of resources for a second sidelink communication having a second direction that is one of the forward direction or the reverse direction;

compare a first priority of the sidelink communication with a second priority of the second sidelink communication, the second priority indicated in the received sidelink control indicator;
select, by the first UE for a sidelink communication having a direction that is one of the forward direction or the reverse direction, a set of resources for the sidelink communication based at least in part on the direction of the sidelink communication and the first set of parameters or the second set of parameters that correspond to the direction of the sidelink communication, wherein the set of resources for the sidelink communication is selected based at least in part on the second direction of the second sidelink communication, wherein the set of resources for the sidelink communication is selected based at least in part on the comparison of the first priority with the second priority; and
transmit a sidelink control message to the second UE, the sidelink control message indicating the selected set of resources for the sidelink communication and the direction of the sidelink communication.

18. The apparatus of claim 16, wherein the sidelink control indicator comprises a direction indicator identifying the second direction of the second sidelink communication.

19. The apparatus of claim 15, wherein at least one parameter of the first set of parameters has a same value as at least one parameter of the second set of parameters.

20. The apparatus of claim 19, wherein the at least one parameter comprises a resource pool, a quantity of subchannels to be used for the sidelink communication, or both.

21. The apparatus of claim 15, wherein at least one parameter of the first set of parameters has a different value than at least one parameter of the second set of parameters.

22. The apparatus of claim 21, wherein the at least one parameter comprises a resource pool, a quantity of subchannels, a priority of the sidelink communication, a remaining packet delay budget, a resource reservation interval, a periodicity, a frequency, an interleaving pattern for sidelink communications having the forward direction, an interleaving pattern for sidelink communications having the reverse direction, or any combination thereof.

23. The apparatus of claim 15, the one or more processors further configured to cause the apparatus to:
receive control signaling indicating a resource allocation mode for sidelink communications, wherein the first set of parameters and the second set of parameters are obtained based at least in part on the control signaling.

24. The apparatus of claim 23, wherein the control signaling is received in a radio resource control message.

25. The apparatus of claim 15, the one or more processors further configured to cause the apparatus to:
receive the sidelink communication from the second UE in the selected set of resources based at least in part on the transmitted sidelink control message, wherein the direction of the sidelink communication is the reverse direction.

26. The apparatus of claim 15, the one or more processors further configured to cause the apparatus to:
transmit the sidelink communication to the second UE in the selected set of resources based at least in part on the transmitted sidelink control message, wherein the direction of the sidelink communication is the forward direction.

* * * * *